United States Patent [19]

Skierski

[11] 4,295,768

[45] Oct. 20, 1981

[54] CHIP BREAKER SCREWS

[75] Inventor: Edwin J. Skierski, Campbellsville, Ky.

[73] Assignee: USM Corporation, Farmington, Conn.

[21] Appl. No.: 77,664

[22] Filed: Sep. 21, 1979

[51] Int. Cl.³ .............................................. F16B 25/00
[52] U.S. Cl. ..................................... 411/387; 408/227
[58] Field of Search ...................... 85/41, 47; 408/227, 408/228, 229, 230; 411/387

[56] References Cited

U.S. PATENT DOCUMENTS

| | | | |
|---|---|---|---|
| 1,638,230 | 8/1927 | Alsaker | 85/47 X |
| 2,322,894 | 6/1943 | Stevens | 408/230 |
| 2,404,048 | 7/1946 | Gepfert | 408/228 |
| 2,479,730 | 8/1949 | Dewar | 85/47 |
| 2,769,355 | 11/1956 | Crisp | 408/230 |
| 2,966,081 | 12/1960 | Kallio | 408/230 |
| 2,981,127 | 4/1961 | Ransom | 408/229 |
| 3,786,713 | 1/1974 | Sygnator | 85/41 |
| 3,789,725 | 2/1974 | Lindstrom | 85/47 |
| 4,147,088 | 4/1979 | Whittaker, Jr. | 85/41 |

Primary Examiner—Ramon S. Britts
Attorney, Agent, or Firm—Aubrey C. Brine

[57] ABSTRACT

A drilling and thread forming screw is provided with means for breaking the chips produced during the drilling process. An obstruction in the form of a truncated cylindrical element having its flat end portion substantially facing the cutting edge of the cutting surface and having its cylindrical centerline perpendicular to the cutting edge is provided on the cutting surface whereby a chip formed by the drilling process is turned back into a sharp radius, causing the chip to break.

8 Claims, 10 Drawing Figures

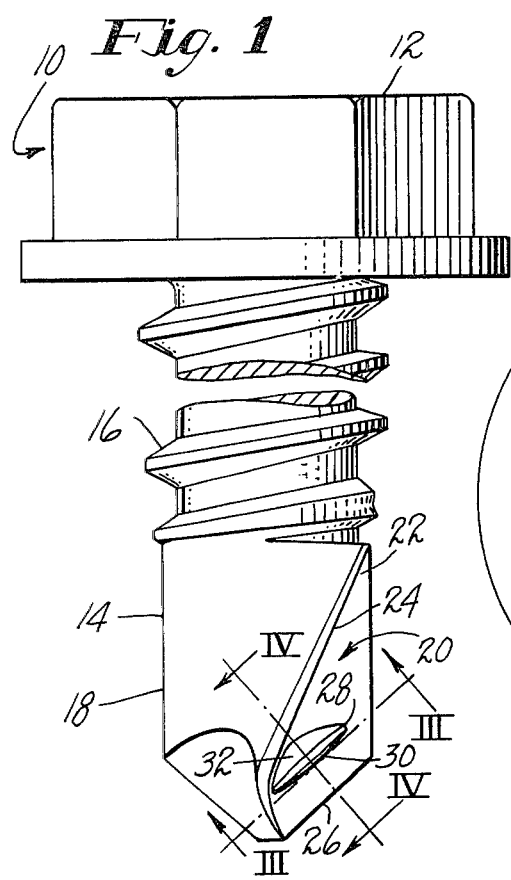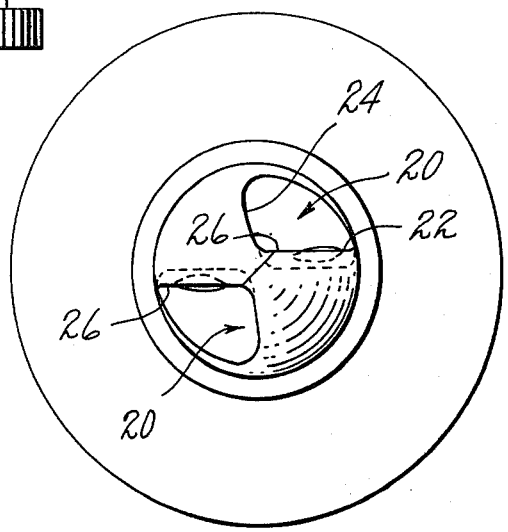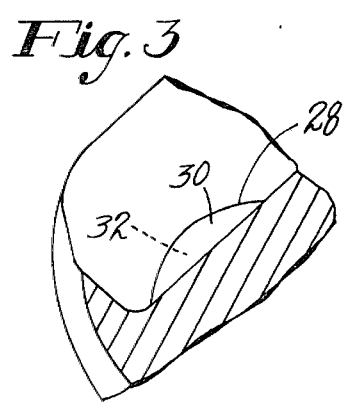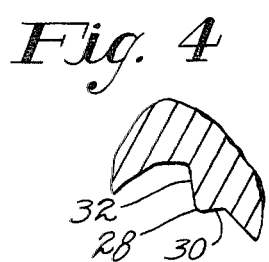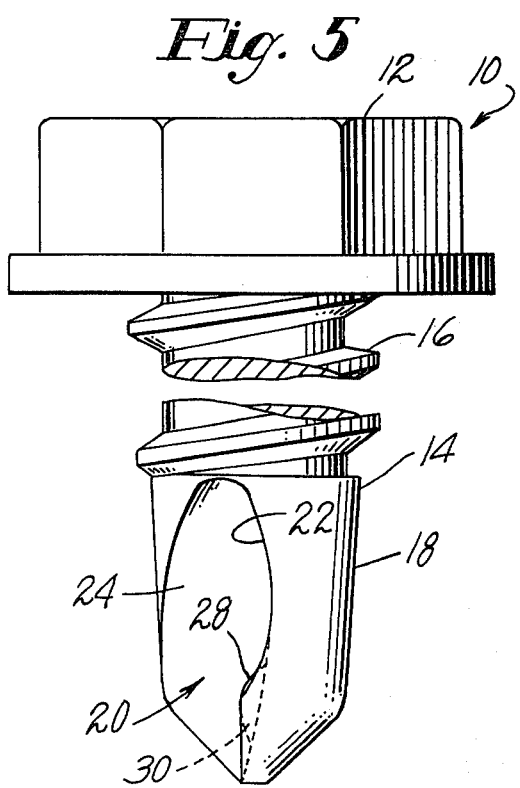

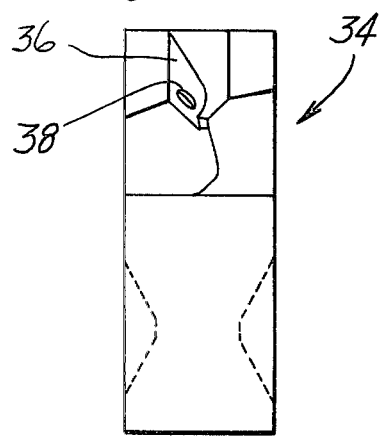
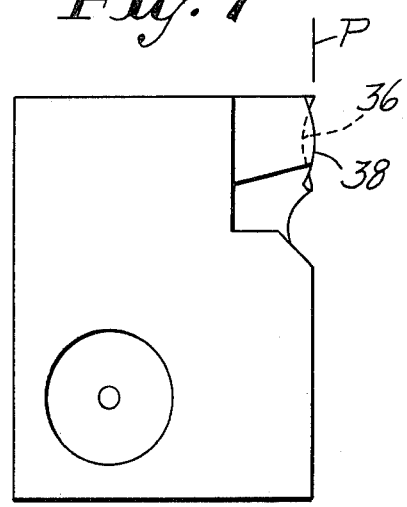
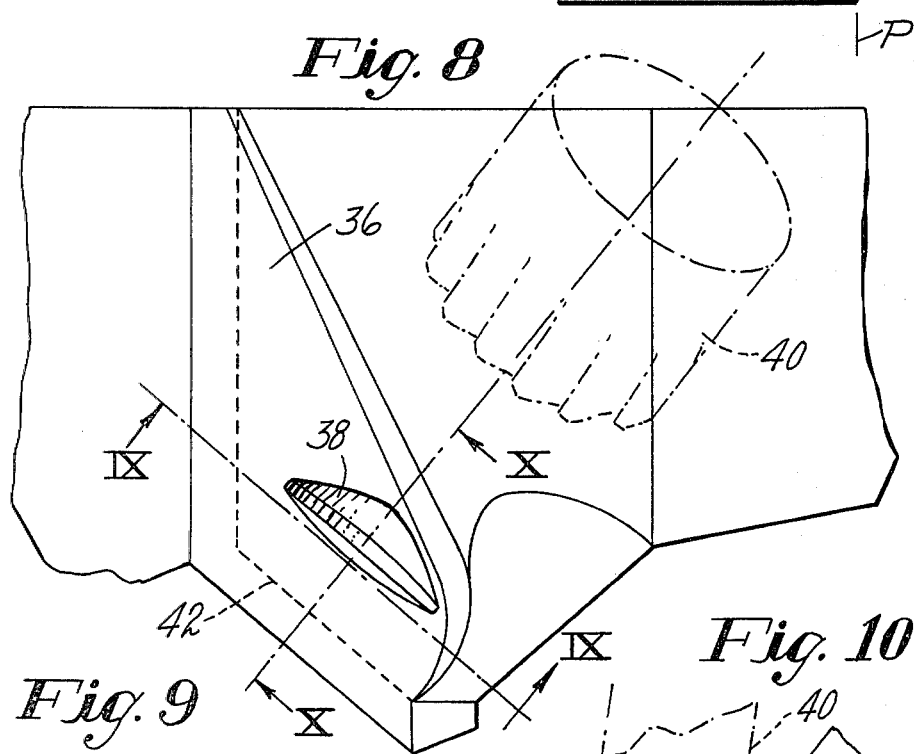
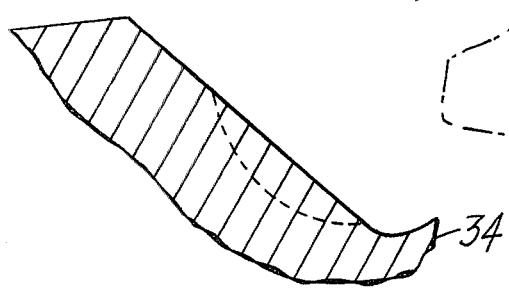
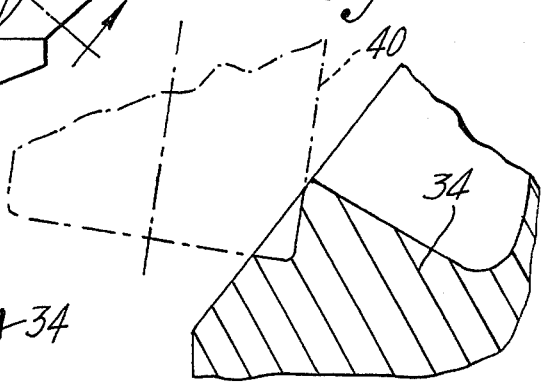

CHIP BREAKER SCREWS

BACKGROUND OF THE INVENTION

The present invention relates to a drilling and thread forming rotary threaded fastener or screw, and more particularly to a drilling and thread forming screw which causes the chips formed thereby to break into small discrete pieces.

In U.S. Pat. No. 3,395,603 E. J. Skierski there is shown a drilling and thread forming screw comprising a trailing threaded shank and a pilot end designed to drill through a workpiece of material such as sheet metal. Fasteners of this type have generally met with acceptance in the automotive, building, and appliance fields due to the simplicity of assembly or fabrication as a consequence of their use which results in a savings in both time and money in the assembly operation.

One of the problems which is often confronted in the utilization of fasteners of this type, is the creation of a metal chip which takes the form of a continuous thread of metal formed during the drilling operation of the fastener. These chips may become lodged under the head of the fastener, and are subject to rusting, resulting in an unsightly appearance and an undesirable projection on the surface fastened. It has therefore, been suggested that means be provided on the pilot end of a drilling screw to cause breakage of the metal chip and eliminate the creation of a continuous ribbon-like chip such as may be formed by application of the screw in materials such as sheet metal. Such an arrangement is shown in U.S. Pat. No. 3,786,713 to Henry A. Sygnator.

The present invention, however, takes advantage of the fact that the metal chip in most instances, takes the form of a continuous thread of material due to the fact that any bending of the chip is on a large radius, and that the chip when bent into a tight radius would, in most instances, break into small increments.

It is therefore an object of the present invention to provide a drilling and thread forming screw which does not create a continuous ribbon-like strip of material during application.

Another object of the invention is to provide a drilling and thread forming screw which is capable of breaking a chip of material formed thereby into small discrete particles.

A further object of the invention is to provide a drilling and thread forming screw having a chip breaker formed on the pilot end thereof which is both simple and economical to manufacture.

SUMMARY OF THE INVENTION

The above objects and other objects which will become apparent as the description proceeds are achieved by providing a drilling and thread forming screw comprising a thread shank and a pilot end disposed on a common centerline, and having a pair of flutes extending longitudinally of said pilot end to provide a pair of cutting surfaces disposed substantially along a plane and a pair of drag surfaces substantially perpendicular to the cutting surfaces. The cutting surfaces terminate at a cutting edge forming an angle with the common centerline, and a truncated cylindrical element is disposed on each of the cutting surfaces having its cylindrical centerline substantially perpendicular to the cutting edge. An arcuate end surface of the cylindrical element is disposed at an angle greater than 90° with the cutting edge to thereby direct a continuous chip formed by the cutting surface away from the surface to form a small radius of curvature and thereby cause breakage of the chip.

BRIEF DESCRIPTION OF THE DRAWINGS

The foregoing and other features of the invention will be more particularly described in connection with the preferred embodiment, and with reference to the accompanying drawings wherein:

FIG. 1 is an elevational view of a drilling and thread forming screw having the present invention embodied therein;

FIG. 2 is a bottom plan view of the screw of FIG. 1 showing further details of the invention;

FIG. 3 is a fragmentary sectional view taken along the line III—III of FIG. 1;

FIG. 4 is a fragmentary sectional view taken along the line IV—IV of FIG. 1;

FIG. 5 is a side elevational view of the screw of FIG. 1 showing the screw in further detail;

FIG. 6 is an elevational front view of a screw forming die for manufacturing the screw of FIGS. 1 through 5;

FIG. 7 is a side elevational view showing the die of FIG. 6;

FIG. 8 is a fragmentary view of the die of FIGS. 6 and 7 showing the screw pilot end forming upper portion of the die, taken on an elarged scale for clarity;

FIG. 9 is a fragmentary sectional view taken along the line IX—IX of FIG. 8; and FIG. 10 is a fragmentary sectional view taken along the line X—X of FIG. 8 showing the portion of the die in detail.

DESCRIPTION OF THE PREFERRED EMBODIMENT

Referring to the drawing and in particular to FIGS. 1-5 there is shown a drilling and thread forming screw 10 having a head 12 at one end with an elongated shank 14 extending therefrom. The head 12 may be of any type suitable for accepting a tool for turning the screw to effect insertion into or withdrawal from the workpiece. The shank 14 is further provided with a plurality of helical thread convolutions 16 formed on the trailing portion thereof, and a pilot end 18 is disposed at the end opposite the head 12.

The pilot end 18 as best shown in FIGS. 1 and 2 is provided with a pair of slots or flutes 20, each formed by a cutting surface 22 and a drag surface 24. The cutting surface 22 terminates in a cutting edge 26 which in the embodiment shown in disposed at an angle of substantially 50° with the common centerline C of the head 12 and shank 14.

In order to achieve the objective of the invention, each of the cutting surfaces 22 is provided with a chip breaker element 28 in the form of a partially cylindrical element which can be produced by passing a cutting plane through a flat ended cylinder from a line on the flat end through the cylindrical wall. The element will therefore be referred to, and is best described as a truncated cylinder positioned on the surface 22. Referring to FIGS. 1-5, the chip breaker 28 comprises a ramp surface 30 formed by the end portion of the truncated cylinder, and a sloping curved surface 32 formed by the side of the truncated cylinder and disposed substantially at right angles to the ramp surface 30. It will be noted that the ramp surface 30 intersects the cutting surface 22 at a distance spaced from the cutting edge 26 and that the intersection of the two surfaces form a line substantially parallel to the cutting edge. In the embodiment shown, for instance a number 8 screw, the intersection of the cutting surface 22 and the ramp surface 30 is spaced a distance of 1/32 of an inch from the cutting edge 26.

The chip breaker element 28 of the present embodiment is oriented with regard to the fastener such that a complete cylinder of which the element 28 is a portion thereof would lie with its centerline at an angle of 30° with a plane P which bisects the fastener and is equidistant from the pair of cutting edges 26 as shown in FIG. 2.

Referring now to FIG. 6, there is shown a typical die structure for manufacturing the fastener shown in FIGS. 1–5. The die is very similar to that shown in the aforementioned U.S. Pat. No. 3,395,603 in that a pair of such dies is employed to form the pilot end 18 of the fastener through a forging, or pinch pointing operation. As will be understood by those familiar with the art, a pair of such dies are employed in a machine in facing relation and the unformed pilot end of the fastener blank is inserted between the two dies which are then impacted to create the configuration shown in FIGS. 1–5. As shown in FIG. 6, the die 34 is provided with an outwardly projecting convex surface 36 which forms the cutting surface 22 of the fastener when the forging operation takes place. In order to produce a fastener having the present invention embodied therein, the surface 36 is interrupted by a pocket 38 formed in the surface, to produce a female die surface conforming to the chip breaker element 28 shown in FIGS. 1–5.

As shown in FIG. 7, the plane P as described with regard to FIGS. 1–5 is actually the line at which the mating dies 34 meet and the 30° angle of the chip breaker element 28, as described above, relates to the surface lying along the plane P, or the mating surface of the die 34.

Referring now to FIGS. 8–10, the method of forming the pocket 38 in the die 34 will be described. As shown in those Figures, a substantially flat ended milling cutter 40 is moved into the surface 36 of the die 34 such that its centerline is at right angles to the edge 42 of the die which forms the cutting edge 26 of the fastener formed thereby. Additionally, the milling cutter 40 is oriented by presenting it at an angle of 30° to the face of the die which results in the angle of the ramp surface 30 of the screw 10 being at an angle of 30° to the plane P as shown in FIG. 2.

In operation the screw 10 is turned into the workpiece to form a pilot hole for introduction of the threads into the workpiece. As the screw 10 is turned, spiral chips are formed at the cutting edge 26 and ride upwardly along the cutting surface 22. Upon contacting the surface 30 which is less than 90° to the plane P and therefore acts as an inclined ramp, the chips are rolled backwardly upon themselves at a small angle produced by the angle of the ramp surface and the small radius into which the chip is formed tends to break the chip into small pieces.

The novel chip breaker element 28 is therefore effective to break a metalic chip into small discrete segments, which are easily carried away along the flute, and do not interfere with the thread convolution 16 when introduced into the opening formed by the pilot end.

I claim:

1. A drilling and thread-forming screw comprising a threaded shank and a pilot end disposed on a common centerline, a pair of flutes extending longitudinally of said pilot end to provide a pair of cutting surfaces disposed substantially parallel to a common plane and a pair of drag surfaces substantially perpendicular to said cutting surfaces, each of said cutting surfaces terminating at a cutting edge forming an angle with said common centerline, each of said cutting surfaces further having disposed thereon a discrete chip breaker in the form of a truncated cylindrical element having its cylindrical centerline substantially perpendicular to said cutting edge, and an end surface having an arcuate periphery, said surface forming an angle greater than 90° with said cutting surface to thereby form a ramp to direct a continuous chip formed by said cutting surface away from said surface to form a small radius of curvature and thereby cause breakage of the chip, said chip breaker being spaced from the edges of said cutting surface, including said cutting edge whereby the configuration of said pilot end is substantially unchanged by the addition of said discrete chip breaker.

2. A drilling and thread forming screw as set forth in claim 1 wherein said cylindrical centerline is disposed at substantially 30° with respect to the plane of said cutting surfaces.

3. A drilling and thread forming screw as set forth in claim 1 wherein the intersection of said cylindrical element with said cutting surface forms a line substantially parallel to the cutting edge.

4. A drilling and thread forming screw as set forth in claim 1 wherein said cutting edge is at an angle of substantially 50° with said common centerline.

5. A drilling and thread forming screw as set forth in claim 1 wherein the intersection of said cylindrical element with said cutting surface forms a line substantially parallel with the centering edge and spaced therefrom a distance of at least 1/32 inch.

6. A drilling and thread forming screw as set forth in claim 2 wherein the intersection of said cylindrical element with said cutting surface forms a line substantially parallel to the cutting edge.

7. A drilling and thread forming screw as set forth in claim 6 wherein said cutting edge is at an angle of substantially 50° with said common centerline.

8. A drilling and thread forming screw as set forth in claim 7 wherein the line formed by the intersection of said cylindrical element with said cutting surface is spaced from said cutting edge a distance of at least 1/32 inch.

* * * * *